Patented Apr. 2, 1935

1,996,487

UNITED STATES PATENT OFFICE 1,996,487

PLASTIC, ELASTIC, FLEXIBLE SUBSTANCES AND METHOD OF MAKING THEM

Joseph C. Patrick, Trenton, N. J.

No Drawing. Application June 10, 1932,
Serial No. 616,496

2 Claims. (Cl. 260—6)

In my prior Patent No. 1,890,191 it was pointed out that certain organic oxygen compounds containing methylene groups or substituted methylene groups are capable of producing elastic substances when caused to react with inorganic polysulfides. In that application it was pointed out that substances, such as the aldehydes may be used; that in general negative radicals, such as oxygen for example could take the place of the halogen radicals wholly or in part, in promoting the interaction between polysulfide sulfur and the methylene or substituted methylene residues.

In the present application there is described particularly the process and the reaction products derived from the interaction of polysulfides (of the type of those derived from the action of oxides, and hydroxides of the alkalies and alkaline earth metals upon sulfur) and the compounds containing oxygen and a methylene group or a substituted methylene group, which would appear to be especially desirable due to their probable availability; namely, furfuraldehyde and the dichloroethers. The product resulting from these reactions is believed to be chemically a poly-methylene polysulfide product and is usually of a yellowish color, containing from 60 to 85% of combined sulfur, depending on the type of organic reactant used. The product possesses considerable resistance to solution in many organic solvents together with flexibility and elasticity to a high degree.

While the di-, tri-, and pentasulfides or mixtures of them may be used, it has been found that the most suitable polysulfide for this purpose is a solution containing for the most part a tetrasulfide. The cheapest and most readily prepared are those of calcium and sodium. It will be obvious from what follows that any metallic radical or group which behaves like a metal sufficiently to form a reasonably stable soluble polysulfide can be used instead of sodium or calcium. Among these may be mentioned potassium, ammonium, barium, strontium, lithium, triethanolamine, etc.

For purposes of illustration, I will now describe the preparation and use of a suitable solution of the tetrasulfide of sodium which may be used in this invention.

A suitable double molar solution of sodium tetrasulfide may be prepared by dissolving 240 g. of sodium hydroxide in about 500 c. c. of water and adding thereto 320 g. of powdered sulfur, which has been previously emulsified or "wetted" with a small amount of water containing a little alcohol or rosin soap as a "wetting" agent. The mixture is brought to its boiling point (usually around 110–112° C.) and held there until all the sulfur has reacted to form polysulfide and thiosulfate, usually about 30 minutes is sufficient. The mixture is then cooled somewhat and diluted to 1000 c. c. and yields a solution comprising essentially two moles of $Na_2S_4$ and one mole of $Na_2S_2O_3$.

*Example I.*—To one liter of a suitable polysulfide, such as the one above described, are added 96 grams of furfuraldehyde and the mixture suitably agitated, preferably using mechanical agitation. The reaction mixture may be heated to about 70° C. with advantage as such moderate heating greatly accelerates the process and does no harm. The time may be shortened by increasing the temperature, but danger of decomposition arises if the temperature is too high. Lower temperatures than 70° C. may be used but require longer times. The time required for practical purposes is about five hours at 70° C. and although the reaction is not chemically complete at that time the formation of the gum-like reaction product has substantially ceased. The rate of the reaction and the degree or completion of the reaction are considerably improved if a considerable concentration of methyl or ethyl alcohol is present in the reaction mixture and the reaction vessel is connected with a reflux condenser.

The product resulting from the reaction is sticky. It may be separated from the reaction mixture and repeatedly kneaded and washed with water until it is substantially free from soluble matter, during which procedure it acquires a much firmer and more elastic character.

*Example II.*—To one liter of a suitable polysulfide, such as that described, are added, preferably a little at a time, 143 g. of BB-dichloroethyl ether. The mixture should be agitated properly, preferably with mechanical agitation and may, with advantage, be warmed during the reaction, to about 60 to 70° C. The reaction time at such a temperature is usually about three hours under the best conditions and results in the substantial disappearance of the dichloroether. The product is a gum-like mass usually having a powerful odor somewhat resembling garlic. It may be washed substantially free from soluble matter and objectionable odor by kneading it in water. In its final form it is usually a light yellow elastic solid and possesses excellent chemical stability.

*Example III.*—To one liter of a suitable polysulfide, such as that described above, are added preferably a little at a time, 115 g. of B-B dichloromethyl ether. The reaction vessel should preferably be equipped with a reflux condenser and the operation preferably carried out under a hood. It is preferable to use a temperature not exceeding about 40 to 50° C. in this reaction if it is desired to shorten the time necessary by using elevated temperatures.

All these reaction products are fairly readily purified by exhaustive washing with cold, or preferably warm (40° C.), water and are, when suitably purified, elastic flexible substances capable of compounding and processing into elastic flexible manufactured articles suitable for gaskets, impregnated or coated fabrics, such as cloth, or asbestos and are capable of other uses which will be suggested by the properties of the products. They have a good degree of electrical resistance and are suitable for many applications in the electrical industry where their high resistance to atmospheric oxygen, ozone, organic solvents and water, together with good dielectric properties, render them peculiarly suitable.

I claim:

1. The method which comprises causing reaction between alkaline polysulfides and furfural.

2. A product comprising the reaction products between alkaline polysulfides and furfural.

JOSEPH C. PATRICK.